C. E. KLINK, C. V. WILGUS & F. H. BICKFORD.
ITEM INDICATOR.
APPLICATION FILED JULY 12, 1913.

1,136,016.

Patented Apr. 20, 1915.
6 SHEETS—SHEET 1.

Fig. 1.

WITNESSES:
Jos F Collins
W H Kreitz

INVENTORS.
Charles V. Wilgus,
Charles E. Klink, and
Frank H. Bickford
BY
Ralph L. Warfield
ATTORNEY C. E. KLINK, C. V. WILGUS & F. H. BICKFORD.
ITEM INDICATOR.
APPLICATION FILED JULY 12, 1913.

1,136,016.

Patented Apr. 20, 1915.
6 SHEETS—SHEET 2.

C. E. KLINK, C. V. WILGUS & F. H. BICKFORD.
ITEM INDICATOR.
APPLICATION FILED JULY 12, 1913.

1,136,016.

Patented Apr. 20, 1915.
6 SHEETS—SHEET 3.

WITNESSES:
Jos. F. Collins
W. H. Kreitz

INVENTORS.
Charles V. Wilgus,
Charles E. Klink, and
Frank H. Bickford
By Ralph S. Warfield
ATTORNEY C. E. KLINK, C. V. WILGUS & F. H. BICKFORD.
ITEM INDICATOR.
APPLICATION FILED JULY 12, 1913.

1,136,016.

Patented Apr. 20, 1915.
6 SHEETS—SHEET 4.

C. E. KLINK, C. V. WILGUS & F. H. BICKFORD.
ITEM INDICATOR.
APPLICATION FILED JULY 12, 1913.

1,136,016.

Patented Apr. 20, 1915.
6 SHEETS—SHEET 5.

Fig. 8.

WITNESSES:

INVENTORS.
Charles V. Wilgus,
Charles E. Klink, and
Frank H. Bickford
BY
ATTORNEY C. E. KLINK, C. V. WILGUS & F. H. BICKFORD.
ITEM INDICATOR.
APPLICATION FILED JULY 12, 1913.

1,136,016.

Patented Apr. 20, 1915.
6 SHEETS—SHEET 6.

Fig. 9.

WITNESSES:
Jos. F. Collins
W. H. Kreitz

INVENTORS.
Charles V. Wilgus,
Charles E. Klink, and
Frank H. Bickford,
BY
Ralph S. Warfield.
ATTORNEY

UNITED STATES PATENT OFFICE.

CHARLES E. KLINK, CHARLES V. WILGUS, AND FRANK H. BICKFORD, OF KINGSTON, PENNSYLVANIA, ASSIGNORS TO THE ADDER MACHINE COMPANY, OF WILKES-BARRE, PENNSYLVANIA, A CORPORATION OF PENNSYLVANIA.

ITEM-INDICATOR.

1,136,016.  Specification of Letters Patent.  Patented Apr. 20, 1915.

Application filed July 12, 1913. Serial No. 778,690.

*To all whom it may concern:*

Be it known that we, CHARLES E. KLINK, CHARLES V. WILGUS, and FRANK H. BICKFORD, citizens of the United States, and residents of Kingston, Luzerne county, Pennsylvania, have invented new and useful Improvements in Item-Indicators, of which the following is a specification.

This invention relates to item indicators, such, for instance, as are applied to calculating machines to count the number of items registered. Its use is not confined to this class of machines, however.

The invention is an improvement on that disclosed in the application of Henry Küntzler, filed in the United States Patent Office, November 11, 1912, Serial Number 730,630, wherein an item indicator is applied to a key set calculating machine having counters, and drive members therefor. Depressing any numeral key on the keyboard of said calculating machine, projects a stop in the path of a corresponding drive mechanism to arrest the latter and determine the extent of rotation to be imparted thereby to its respective counter. The drive mechanism, upon its advance toward the stop, operates an adjusting device to shift one member of a normally disabled coupling, forming part of the indicator-operating mechanism, into the path of a moving part of the machine.

The shiftable coupling member was held in set position by friction, and owing to the comparatively slight throw of the drive mechanism when small numbers are registered, and hence the comparatively slight throw imparted to the shiftable member, the clearance between the latter member and the moving part of the machine was reduced to a minimum.

One object of the present invention is to improve the former device, to render it more efficient and reliable in operation. Accordingly, the shiftable member of the indicator-operating mechanism, is locked in set position, to insure its coaction with the moving part of the machine. Also sufficient clearance between the shiftable member and said moving part is afforded, to reduce the liability of accidental operation, on idle strokes of the machine. Furthermore, the restoration of the adjusting mechanism to normal position is insured; and strain and disarrangement of the indicator-operating mechanism avoided, on idle clearing strokes.

Other objects and advantages will be more fully set forth hereinafter and particularly pointed out in the claims.

In the accompanying drawing.

Figure 1:
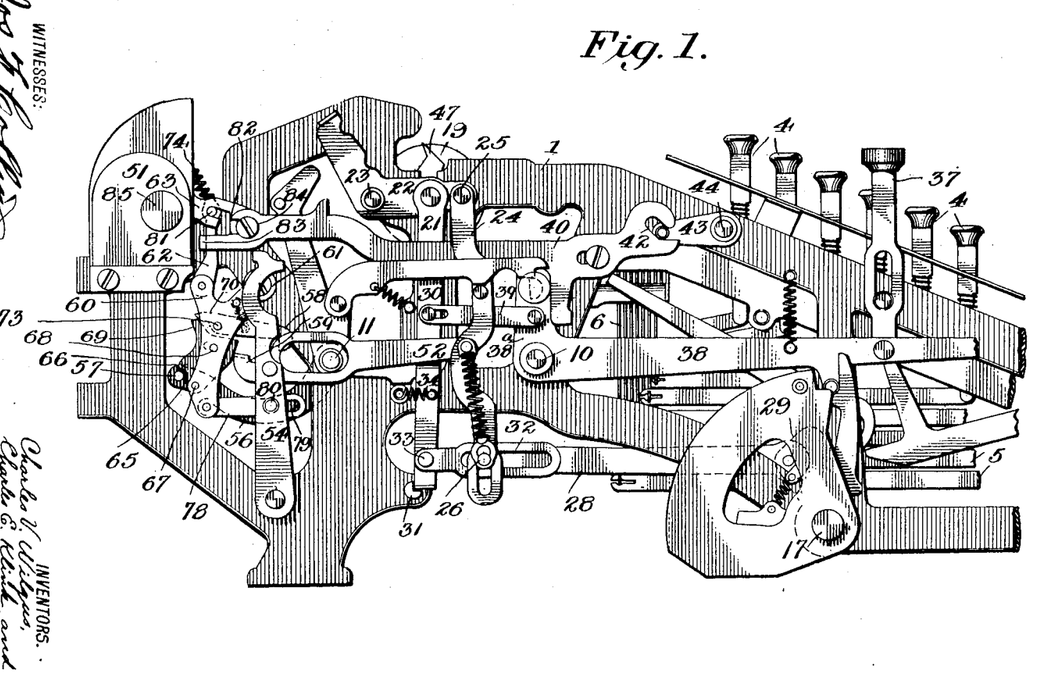
Figure 1 is a side view of one embodiment of the invention, applied to the well-known Wales adding and listing machine, the machine being at rest.
Figure 2:
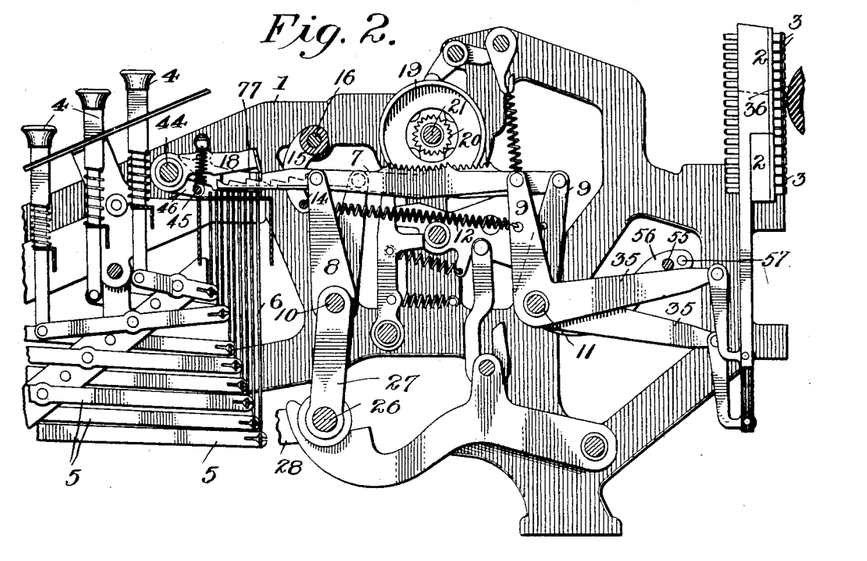
Fig. 2 is a sectional view, illustrating some of the operating parts of such adding and listing machine, which affect the operation of the item counter.

Reference is made to U. S. Patents to McFarland, 842,232, January 29, 1907; to Wales, 797,032, August 15, 1905, and to White, 940,766, November 23, 1909, to illustrate and explain such parts of the Wales machines as are not herein fully disclosed. The side frames 1, 1 (Fig. 1) support between them a keyboard mechanism, a registering mechanism, and a printing mechanism, the latter including type carriers 2 (Fig. 2), having types 3. The keys 4 of the keyboard are arranged in banks. Depression of any of the keys rocks levers 5 (Fig. 2) to project stops 6. The stops are arranged in rows corresponding with the banks of keys which control them. The stops 6, when projected, control the excursions of racks or drive members 7, there being one drive member for each row of stops. Front and rear arms 8 and 9, journaled on a cross shaft 10 and a cross rod 11, respectively, support the several drive members. Springs 12, preferably connected to the rear supporting arms 9, tend to advance the drive members toward the stops 6. A restraining and restoring bail 14 mounted in arms 15 fast on a rock shaft 16, contacts the drive members 7 or the forward supporting arms 8, to prevent their advance under the action of the drive springs. Turning a main drive shaft 17 (Fig. 1) on its initial stroke, withdraws said restraining bail 14 by rotating the rock shaft 16 through well known mechanism (not shown), to free the drive members to the action of their springs 12. The springs advance the drive members until the latter are arrested by such stops 6 as have been projected by depression of the keys 4 (Fig. 2). Detainers 18 for each row of stops, normally arrest those drive members into whose paths no stops have been projected. The stops, when projected, displace the corresponding detainers.

The drive members operate counters 19 (Fig. 2) to register thereon amounts corresponding to the values of the keys depressed. Said counters each have a pinion 20, to turn therewith and are individually rotatable on an axle 21, (Figs. 1 and 2) mounted at its opposite ends in arms 22, (Fig. 1) pivoted at 23 to the side frames. Props 24 pivoted at 25 to the arms 22, hold the counters normally in idle position. Said props are preferably slotted at their lower ends to rest on a trip rod 26, extending across the machine and supported by radius links 27, (Fig. 2) depending from the cross shaft 10. Links 28, (Fig. 1) and cranks 29 connect the trip rod 26 and the main drive shaft 17. The main drive shaft 17 on its forward stroke, rocks the cranks 29 and links 28, to swing the trip rod 26 in a descending arc and thus lower the props 24 resting on the trip rod, the axle 21, and the counters 19 with their pinions 20, to mesh the latter with their corresponding racks 7.

Figure 3:
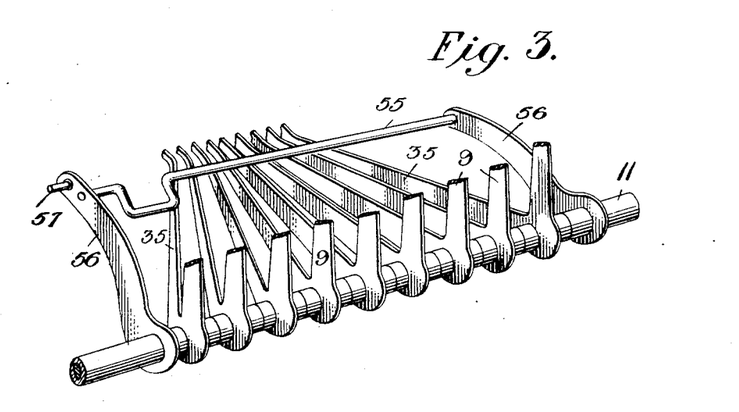
Fig. 3 is a detail perspective view of part of the drive mechanism, illustrating the converging levers.
Figure 5:
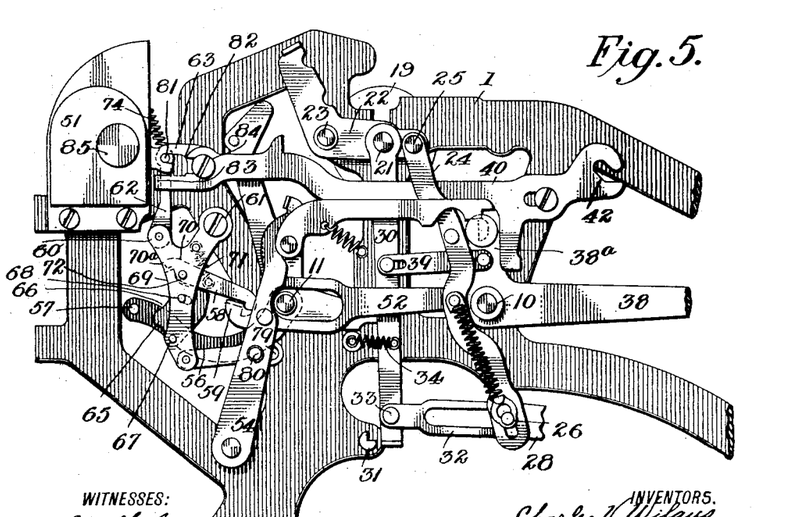
Fig. 5 is a similar view, showing the positions of the parts at the end of the forward stroke of the main drive shaft, the indicator having been operated.
Figure 6:
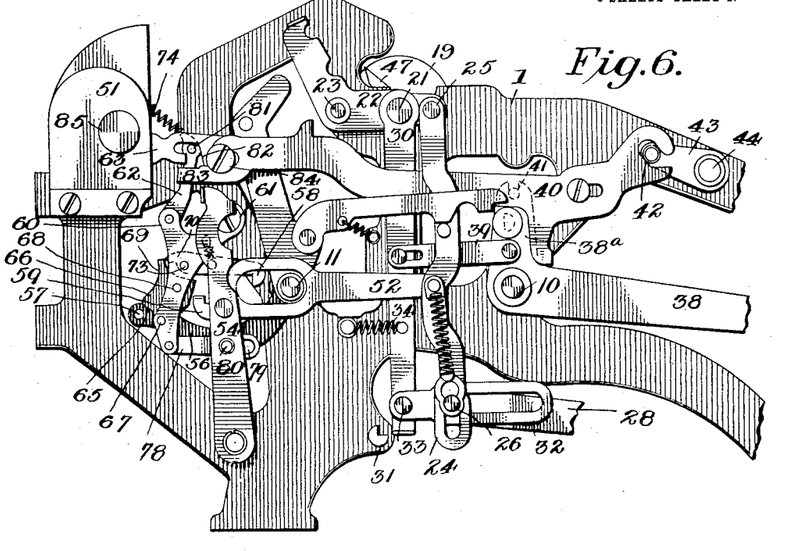
Fig. 6 is a similar view, showing the indicator-operating mechanism disabled by the depression of the total key, prior to the forward stroke of the main drive shaft.
Figure 9:
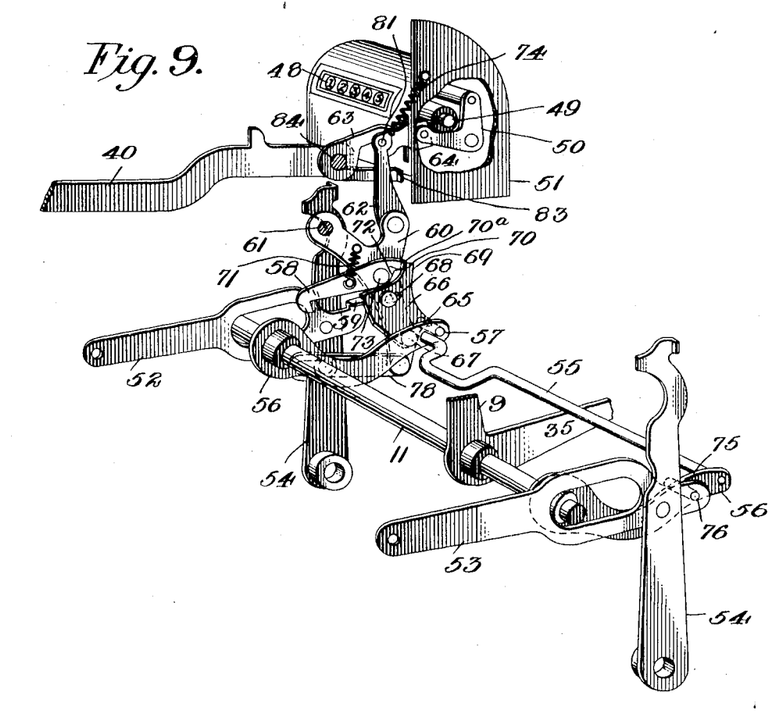
Fig. 9 is a detail perspective view of the indicator and the indicator-operating mechanism, at rest.

In adding operations, the drive members 7 must have sufficient time to advance against the stops 6 before the engagement of the pinions 20 therewith. Accordingly, legs 30 (Fig. 1) depending from the axle 21, or the arms 22, lie in position to normally seat on rests or steps 31, mounted on the side frames 1. As the axle with its counters 19 begins its descent, the legs 30 seat on the rests or steps 31 (Fig. 4) to arrest the counters against further descent until the drive members 7, which have been freed by the withdrawal of the restraining and restoring bail 14, complete their advance. Meanwhile, the trip rod 26 travels idly in slots formed in bridle links 32 (Figs. 1, 4 and 5) connected at 33 to the legs 30 until, near the end of the forward stroke, the trip rod 26 strikes the forward end walls of the slots in links 33 (Fig. 5) and dislodges the legs from their seats, whereupon the counters 19 drop to engage their pinions 20 with their respective racks 7. The main drive shaft, on its return stroke, forces the restraining and restoring bail 14 against the spring-advanced rack-supporting arms 8 to retire the drive members, which, during such retirement, turn the counters 19 to register or accumulate amounts corresponding to the values of the keys depressed. The main shaft on its return, restores the trip rod 26 which at first travels idly relatively to the counters 19, to enable the drive members 7 to complete the registration of the amounts on the counters, after which the trip rod swings upwardly, owing to the radius links 27, to raise the props and disengage the counters from their drive members, which latter by that time have been retired. Returning springs 34 restore the legs 30 into line with their rests 31, when the legs have been raised sufficiently to clear the rests. The type carriers 3 are secured to converging levers or rearward extensions 35 (Figs. 2 and 3) of the rear arms 9. The stops 6 and detainers 18, by arresting the drive members 7, operate to position the desired types 3 of said carriers, at the printing line on a platen 36 (Fig. 2), said type bars 3 being retired with the drive members. Depressing a total or clearing key 37 (Fig. 1) rocks set levers 38 mounted, at opposite sides of the machine, on the cross shaft 10. Arms 38ª of said levers are connected by links 39 with the supports or legs 30, to swing the latter out of line with their rests 31 when the levers 38 are rocked (Fig. 6). The arm 38ª of one of the set levers 38, thrusts forwardly a connecting bar 40 through a pin and slot connection 41 therewith (Figs. 6 and 7), to press a cam 42 on said bar against a crank 43 on a shaft 44 to rock the latter and with it a displacing bail 45 (Fig. 2) connected by arms 46 thereto. Said bail is effective to shift the detainers 18 to ineffective position, when a total is to be taken or the machine cleared. The main drive shaft 17 is then turned on its forward stroke to swing the trip rod 26, whereupon the counters 19 and their pinions 20 drop, owing to the displacement of the legs 30 relatively to their rests 31, to engage the pinions and drive members 7 prior to the release of the latter by the restraining and restoring bail 14. The subsequent withdrawal of the bail 14 frees the drive members, which advance until arrested by a zero-resetting mechanism, including detents 47 on the respective numeral wheels, such as disclosed in U. S. Patent to McFarland, 842,232, January 29, 1907. The drive members 7, on such advance, turn the counters 19 in a direction the reverse of that in which they turn when registering, and the detents 47 arrest said counters when the latter are restored to zero-positions. The racks, by their advance, position the typecarriers and types to print the amount registered by the counters prior to the depression of the total key 37. The printing operation then occurs, and, providing the total key is released at the end of the forward stroke, the counters 19 are disengaged from the drive members 7, which latter, together with the typecarriers, are retired by the restraining and restoring bail 14. In taking a subtotal, the total key 37 is held depressed throughout nearly the entire operation, to prevent the disengagement of the counters 19 and drive members 7 until the latter part of the return stroke. The counters are returned to zero-position and the total amount printed as just described, after which, the drive members, when being retired, turn the counters, as in the adding operation, to again register the amount disclosed prior to the depression of the total key, and thus retain the amount in the machine. To indicate the number of items registered on the machine, and item indicator (Fig. 9) of any suitable construction is provided. Said indicator includes a gang of numeral wheels 48 mounted on a shaft 49 and driven in any convenient manner, as by a rocking frame 50 mounted in the indicator casing 51.

In an adding operation, the drive springs 12 (Fig. 2) which advance the racks 7, rock the extensions or converging levers 35 of the rear rack-supporting arms 9 to operate an adjusting mechanism, including a universal bail 55 (Figs. 3 and 9), lying across the extensions and supported in arms 56 journaled on the cross rod 11. A stud or adjuster 57 projecting from one of the arms 56, shifts a normally idle catch 58 into the path of a coöperating hook or coupling 59 on a pitman 52 constituting a moving part of the machine. The main drive shaft 17 at every stroke, operates pitmen 52, 53 (Fig. 1) connected to the respective props 24 on opposite sides of the machine, to rock disabling levers 54 which control a numeral wheel locking device, (not shown) disclosed in U. S. Letters Patent to White, 940,766, issued November 23, 1899. The catch 58 is mounted on a swinging carrier 60 pivoted at 61 to the machine, and a link 62 connects said carrier with an operating lever 63 projecting through a slot 64 (Fig. 9) in the indicator casing 51 to engage the rocking frame 50. The pitman 52 rocks the frame 50 through the foregoing train of mechanism to effect an operation of the indicator.

The foregoing construction is, in the main, old or disclosed in the prior application of Küntzler above referred to, and only constitutes part of the present invention, in so far as it is combined with the new devices now to be set forth. In addition to their other work, it will be seen that the drive springs 12 of the racks operate the adjusting mechanism 55, 56, 57, and the shiftable spring-pressed catch 58. This additional load should be as light as possible, to prevent retarding the type bar action. Frictional means to hold the shiftable catch 58 where adjusted, if light enough to avoid unduly loading the drive springs 12, often fails to hold the catch in effective position when the latter is placed below the coupling 59; or if placed above said coupling, it might permit the latter to drop to effective position on idle or other strokes, no record of which is desired on the item indicator. By arranging the adjusting mechanism to directly operate the shiftable catch, but little clearance could be allowed between the catch, when idle, and the coupling 59, due to the comparatively slight throw of the racks 7, when registering amounts comprising digits of low values, and consequently, on any idle stroke, when the racks advance until arrested by the detainers 18, to position the zero types at the printing line, it might be possible, particularly if the operator gave the main drive shaft 17 a sharp jerk, to shift the catch 58 to effective position. To avoid these objections, we contrive to increase the throw imparted by the adjusting mechanism to the catch, to enable a greater clearance to be provided between the shiftable catch and its driving part, and also to positively lock the catch in effective position. Accordingly, the adjusting stud 57, when rocked by the converging levers or extensions 35, wipes along a shoulder 65 (Fig. 1) on a trip member 66, pivoted at 67 on the swinging carrier 60. A slot and pin connection 68 prevents overthrow of the trip in either direction. A finger 69 on the trip normally lies adjacent a cam face 70$^a$ (Fig. 4) on the tail 70, of the catch 58, and when the adjusting mechanism rocks the trip, this finger presses against the cam face to shift the catch into the path of the coupling 59 on the pitman 52, against the tension of its retracting spring 71. The finger passes under the tail of the catch to positively lock the latter where adjusted, and the retracting action of the spring 71 tends to hold the trip finger in effective position. The finger 69 may enter a seat 72 in the tail 70 of the catch (Figs. 4 and 5) to prevent disengagement of the catch and pitman. The catch normally lies well out of the path of the pitman, (Fig. 1) and is given a throw sufficient to enter said path by the pressure of the finger 69 against the comparatively sharp incline of the cam face 70$^a$ combined with the relatively short distance between said face and the pivotal point 73 of the catch, in comparison to the longer distance between said pivotal point and the hooked end of the catch. On the forward stroke, the coupling 59 which lies behind and beneath catch 58, (Figs. 1 and 4), travels forwardly to contact the catch 58 (Fig. 5) and draw it forwardly, to rock the carrier 60 on its pivot 61 and pull the link 62 downwardly. Said link, being connected to the operating lever 63, draws the latter downwardly, to rock the operating frame 50 of the item indicator. The pitman 52 on its return stroke, releases the catch 58 which, in the present instance, is partially retired by its spring 71 at the moment of disengagement of the pitman and catch, and at about the same time, a spring 74 (Fig. 9) connected to link 62, assists to partially return the carrier to normal position. Said catch is not completely restored to idle position until the pitman contacts the trip plate 66 which has been shifted into its path when the carrier is rocked by the operation of the pitman on the catch on its forward stroke. The contact of the pitman 52, or its coupling 59, with the trip 66, rocks the latter to withdraw the finger 69 from beneath the tail 70, whereupon the spring 71 snaps the catch 58 to idle position. The pitman, by continued pressure against the trip, restores the carrier and normally lies against the trip plate 66 when at rest.

Figure 4:
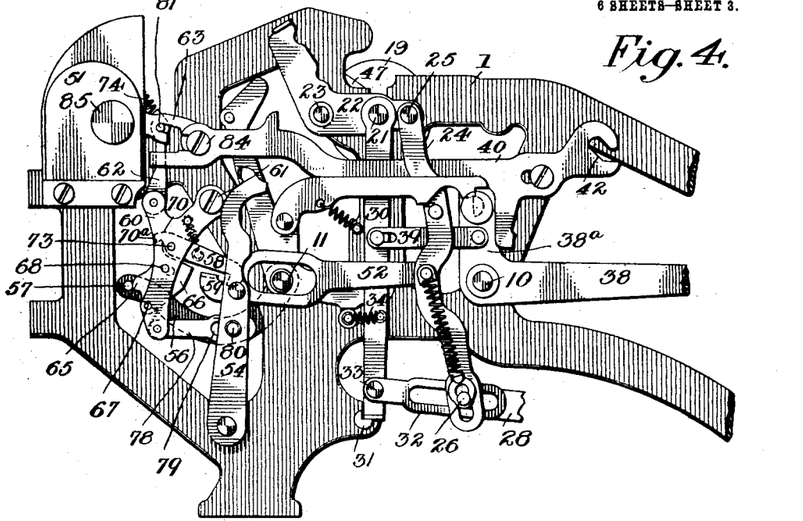
Fig. 4 is a detail side view, the adjusting mechanism having operated the trip to set the shiftable catch during the forward stroke of the main drive shaft, and prior to the operation of the item indicator mechanism.
Figure 7:
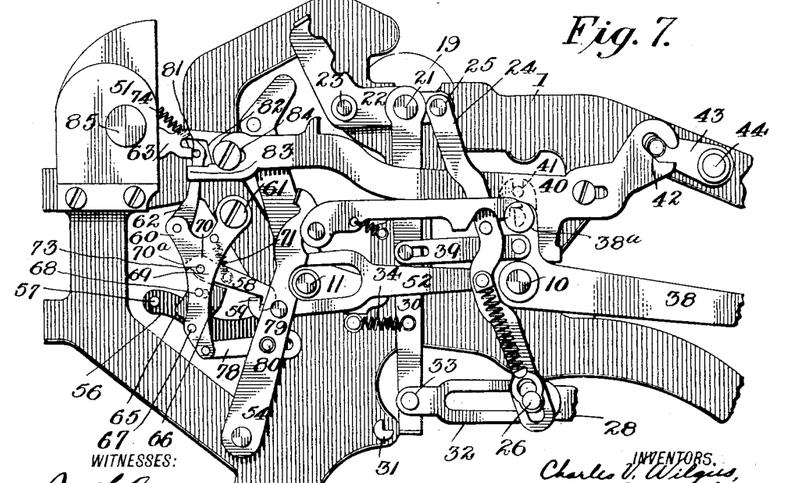
Fig. 7 is a similar view, showing the positions of the parts at the end of an active total or clearing stroke.
Figure 8:
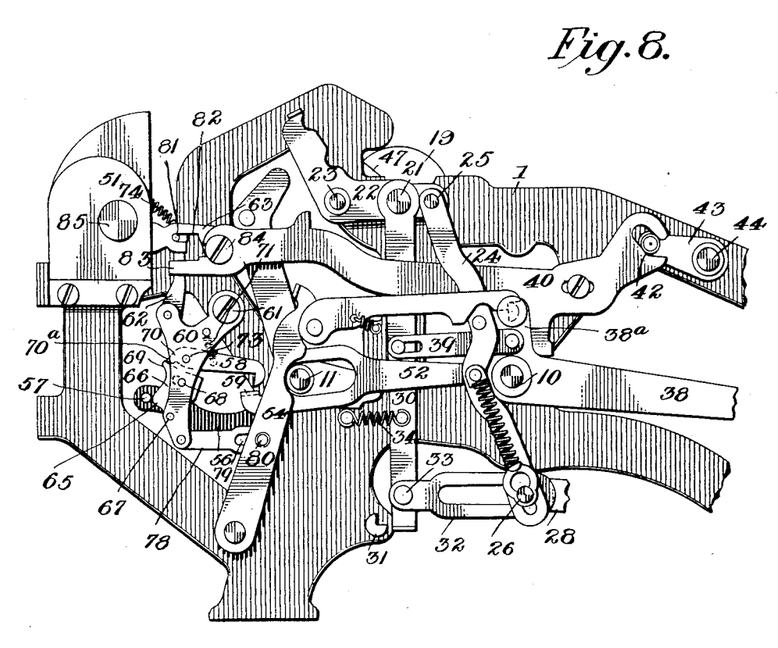
Fig. 8 is a similar view, showing the displacement of the indicator-operating mechanism on an idle total or clearing stroke.

The adjusting mechanism wipes past the shoulder 65 on the trip when items containing digits of high values are registered and then drops back by gravity to normal position on the extensions 35 of the rear arms 9, as the extensions are lowered. To insure such return, one of the arms 56 (Fig. 9), of the adjusting frame is inclined or curved, as at 75, so that when the frame is elevated by the action of the extensions 35, on the forward stroke of shaft 17, the curved portion of the arm enters the path of a stud 76 on the pitman 53. On the return stroke, this pitman presses the stud 76 against the arm 56 to depress the adjusting frame in time to take part in the next operation of the machine, in case the adjusting mechanism does not return to normal position with the extensions 35. The clearing or total key 37 is sometimes depressed to take a blank total or clearing stroke, to give assurance that the machine is clear prior to setting up a new item thereon, as when the operator commences his work, for instance. Depression of the total key 37 displaces the legs 30 and the detainers 18 as before explained. Turning the main drive shaft 17, first effects the engagement of the pinions 20 of the counters with the racks or drive members 7, as heretofore explained, and then withdraws the restraining and restoring bail 14 to free the drive members to the action of their springs 12. The racks, however, can only advance a slight distance, sufficient to position the zero types at the printing line, before the well-known Wales zero-resetting mechanism controlled by the total or clearing key, and including the detents 47 on the counters, arrests the racks. On the return stroke of the main drive shaft 17, the pinions 20 release the racks 7 and leave them free for advancement, prior to the contact of the restraining and restoring bail 14 with the rack-supporting arms 8. The advance of the racks, prior to their arrest in the well-known manner, may be sometimes sufficient to drive the adjusting bail 55 upwardly past the shoulder 65 on the trip 66. This jump of the bail takes place at about the time the shiftable catch 58 is over the coupling 59, which coupling thus locks the catch against operation. To avoid strain and possible injury to the adjusting mechanism, which might follow the contact of the bail 55 and trip 66, means are provided to withdraw the trip to leave the path of the adjusting mechanism unobstructed. Accordingly, a displacing link 78 (Figs. 1 and 8) connects the carrier 60 and the adjacent lock-disabling lever 54, said link preferably having a slot 79 therein entered by a pin 80 on the lever 54, to permit the latter to travel idly until near the end of the forward stroke of the main shaft, whereupon the pin 80 strikes the closed end of the slot 79 to swing the carrier 60 with its trip 66 and shiftable catch 58, to remove the trip from the path of the adjuster 57 (Fig. 8). As the main drive shaft approaches the end of its return stroke, the pin 80 on the disabling lever 54 strikes the opposite end of the slot 79 to return the carrier 60 and the parts mounted thereon, to normal position. As in the Küntzler application hereinbefore mentioned, the item indicator remains at rest on idle strokes of the main drive shaft, because the racks 7 only advance until arrested by the detainers 18, which throw is not sufficient to raise the extensions 35 and the adjusting mechanism far enough to operate the trip. Furthermore, as in said prior application, no operation of the item indicator occurs during the taking of subtotals, or totals, or when clearing the machine. Preferably, a stud 81 on the link 62 enters an angular slot 82 in the operating lever 63 and normally lies in that arm of said slot transverse to the path of the link, as shown in Figs. 1, 4 and 5. Depression of the total or clearing key 37 (Figs. 6 and 7) operates a disengaging member, as a hook 83 on the connecting bar 40, to shift the link 62 so that its stud 81 lies in that arm of the slot 82 in line with the path of the link. (Fig. 6). Turning the main drive shaft effects the operation of the adjusting mechanism, as above explained, to rock the trip 66 and set the shiftable catch 58 in the path of the pitman 52, which latter in its stroke, rocks the carrier 60 (Fig. 7). The carrier, in turn, actuates the link 62 and causes the stud 81 thereof to travel idly in that arm of the slot in line with its path, so that no motion is communicated to the operating lever 63. Upon the return stroke of the main drive shaft, the carrier 60 is restored to normal position by spring 74 and pitman 52, as before explained, thereby raising the link 62 until its stud 81 lies in line with the transverse arm of the angular slot, whereupon the spring 74 snaps the stud into said arm of the slot. For convenience, the operating lever 63 is pivoted at 84 to the machine and releasably engages the rocking frame 50 of the item indicator. Turning a knob 85 on the item indicator, resets the numeral wheels 48 to zero in a well known manner.

Changes may be made in the form and arrangement of the several parts set forth without departing from the spirit and scope of this invention.

What we claim as new is:

1. Means for registering the effective operations of a machine comprising an item indicator; indicator operating mechanism including a normally idle shiftable member; an adjuster actuated by one of the driven parts of the machine at each effective operation thereof; and a trip device shifted by the adjuster to throw the shiftable member into the path of another driven part of the machine and hold it against displacement.

2. Means for registering the effective operations of a machine comprising an item indicator; indicator operating mechanism including a normally idle shiftable member having a cam; an adjuster actuated by one of the driven parts of the machine at each effective operation thereof and a locking trip shifted by the adjuster to co-act with the cam and throw the shiftable member into the path of another driven part of the machine, said trip being effective to hold said shiftable member against displacement.

3. Means for registering the effective operations of a machine comprising an item indicator; indicator operating mechanism including a normally idle shiftable member; an adjuster actuated by one of the driven parts of the machine at each effective operation thereof; and a locking trip pressed against the shiftable member by the adjuster to throw said member into the path of another driven part of the machine, said trip being effective to hold said shiftable member against displacement.

4. Means for registering effective operations of a machine comprising an item indicator; indicator operating mechanism including a shiftable member, a spring to return the member to and hold it in idle position; an adjuster actuated by one of the driven parts of the machine at each effective operation thereof and a locking trip pressed against the member by the adjuster to throw the member into the path of another driven part of the machine, said trip being effective to hold said member against displacement until released.

5. Means to register the effective operations of a machine comprising an item indicator; indicator operating mechanism including a catch having a cam thereon; means to restore the catch to and hold it in idle position; a trip having a finger to contact said cam; an adjuster driven against the trip by a driven part of the machine at each operation thereof to press the finger against the cam and set the catch in the path of another driven part of the machine, said finger being effective to hold the catch in operative position against displacement; and means to release the finger to enable the catch to return to idle position at the conclusion of an effective operation of the machine.

6. Means to register the effective operations of a machine comprising an item indicator; indicator operating mechanism including a catch having a cam thereon, and a seat; means to normally restore the catch to and hold it in idle position; a trip having a finger to contact said cam; an adjuster driven against the trip by a driven part of the said machine at each effective operation thereof to press the finger against the cam and set the catch in the path of another driven part of the machine, said finger being adapted to enter the seat to hold the catch in operative position against displacement by the restoring means; and means to release the finger to enable the catch to return to idle position at the end of an effective operation of the machine.

7. Means to register the effective operations of a machine comprising an item indicator; indicator operating mechanism including a lever; a swinging carrier; a link on the carrier releasably connected with the lever, a catch connected to the carrier; a spring to restore the catch to and hold it in idle position; an adjuster actuated by driven part of the machine at each operation thereof; a pivoted locking trip pressed by the adjuster against the catch to force the latter into the path of another driven part of the machine and hold said catch against displacement; and means to release the locking trip to permit the catch to return to idle position.

8. Means to register the effective operation of a machine comprising an item indicator; normally disabled operating mechanism therefor, adjusting mechanism operated by a driven part of the machine to set the indicator operating mechanism in effective position; and means to insure the return of the adjusting mechanism to normal position.

9. Means to register the effective operations of a machine comprising an item indicator; normally disabled operating mechanism therefor, adjusting mechanism operated by one of the driven parts of the machine to set the indicator operating mechanism in effective position; and a projection of another driven part on the machine to positively engage and return the adjusting mechanism to normal position.

10. Means to register the effective operations of a machine comprising an item indicator; indicator operating mechanism including a shiftable member, an adjuster actuated by a driven part of the machine at each effective operation thereof; a trip shifted by the adjuster to throw the shiftable member into the path of another driven part of the machine and hold said shiftable member against displacement; means to disable the trip to permit the shiftable member to return to idle position; and means to insure the restoration of the adjuster to normal position.

11. Means to register the effective operations of a machine comprising an item indicator; indicator operating mechanism including a shiftable member; an adjuster actuated by a driven part of the machine at each effective operation thereof; a trip shifted by the adjuster to throw the shiftable member into the path of another driven part of the machine and hold said shiftable member against displacement; means to disable the trip to permit the shiftable member to return to idle position; and a restoring member operated by the machine to insure the retirement of the adjuster.

12. Means to register the effective operations of a machine comprising an item indicator; indicator operating mechanism including a shiftable member; an adjuster driven by the machine at each effective operation thereof to set the shiftable member in position to be engaged by a driven part of the machine; and means to insure the retirement of the adjuster.

13. Means to register the effective operations of a machine comprising an item indicator; indicator operating mechanism including a shiftable member; an adjuster including a rocking frame driven by the machine and having a trip toe effective to set the shiftable member in position to be contacted by another driven part of the machine; means to restore the member to idle position; and means operated by the machine to press the rocking frame back to normal position.

14. Means for registering the effective operations of a machine comprising an item indicator; indicator operating mechanism; an adjuster operated at each effective stroke of the machine; a trip controlled by the adjuster to set said indicator operating mechanism in position to be operated by a driven part of the machine; and means controlled by the machine to displace the indicator operating mechanism relatively to the adjuster to prevent the contact of the adjuster with said indicator operating mechanism.

15. Means for registering the effective operations of a machine comprising an item indicator; indicator operating means including a lever; a link engageable with and disengageable from said lever; a rocking carrier to which said link is connected, a catch connected to said carrier, a restoring spring connected to said catch, a locking trip to shift the catch into the path of a moving part of the machine and to hold the catch in set position against the tension of said restoring spring; and an adjuster shifted by another moving part of the machine at each effective operation thereof to operate the trip, said first mentioned part being adapted to return the trip to normal position subsequently to the operation of the item indicator.

16. In a calculating machine the combination of accumulating mechanism; clearing mechanism therefor, an item indicator; indicator operating mechanism including a shiftable member; a trip to set said member in position to be operated by a driven part of the machine; an adjuster actuated by another driven part of the machine to shift said trip; and means controlled by the machine to displace the trip relatively to the adjuster during an idle clearing operation.

17. In a calculating machine, the combination of accumulating mechanism; clearing mechanism therefor; an item indicator; indicator operating mechanism including a shiftable member; a trip to set said mechanism in position to be operated by a driven part of the machine; an adjuster actuated by another driven part of the machine to shift said trip; and a safety link connected to the indicator operating mechanism and controlled by the machine, to shift the indicator operating mechanism out of the path of the adjuster on an idle clearing operation.

Signed this 8th day of July 1913.
  CHARLES E. KLINK.
  CHARLES V. WILGUS.
  FRANK H. BICKFORD.
In the presence of—
  E. M. DETRICK,
  RALPH S. WARFIELD.

Copies of this patent may be obtained for five cents each, by addressing the "Commissioner of Patents, Washington, D. C."